United States Patent
Sakanaka

(10) Patent No.: US 7,190,905 B2
(45) Date of Patent: Mar. 13, 2007

(54) SPATIAL OPTICAL COMMUNICATION APPARATUS

(75) Inventor: Tetsuo Sakanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 10/454,732

(22) Filed: Jun. 3, 2003

(65) Prior Publication Data
US 2003/0223754 A1 Dec. 4, 2003

(30) Foreign Application Priority Data
Jun. 4, 2002 (JP) .............................. 2002-162255

(51) Int. Cl.
H04B 10/00 (2006.01)
(52) U.S. Cl. ....................... 398/129; 398/131
(58) Field of Classification Search ................ 398/122, 398/129, 131

See application file for complete search history.

(56) References Cited

U.S. PATENT DOCUMENTS

| 6,091,528 A | * | 7/2000 | Kanda | 398/122 |
| 6,347,001 B1 | * | 2/2002 | Arnold et al. | 398/122 |
| 2003/0067657 A1 | * | 4/2003 | Dimmler et al. | 359/159 |

* cited by examiner

*Primary Examiner*—Shi K. Li
(74) *Attorney, Agent, or Firm*—Morgan & Finnegan, LLP

(57) ABSTRACT

In a disclosed spatial optical communication apparatus, the optical-axis deviation correction is possible at the same time for both high-speed angular variation with a small amplitude and low-speed angular variation with a large amplitude, and the apparatus has a function of correcting the optical-axis deviation whose application range is wide and whose correction ability is high. To achieve such function, the spatial optical communication apparatus for performing communication between spaced locations with a light beam is provided with both a light deflecting unit set inside an optical system with a narrow variable angle range and a fast response speed, and an optical system driving unit set outside the optical system with a slow response speed and a wide variable angle range.

1 Claim, 4 Drawing Sheets

SPATIAL OPTICAL COMMUNICATION APPARATUS

BACKGROUND OF THE INVENTION

1. Field of the Invention

The present invention relates to a spatial optical communication apparatus for performing communication by transmitting an optical signal with a light beam through free space between spaced opposed locations, and particularly to an apparatus having a function of correcting the deviation of an optical axis of a light beam due to the angular shift of the apparatus.

2. Related Background Art

In general, with a spatial optical communication apparatus for performing communication by transmitting a light beam through free space, it is necessary to use a narrow light beam whose divergent angle is made as small as possible such that the power of light can be effectively transmitted. However, when the light beam is narrowed, the light beam is liable to deviate from a partner apparatus due to the angular variation caused by vibrations of a building or an installation mount resultant from wind pressure, distortion resultant from temperature fluctuation, or the like. Stable communication is hence difficult to achieve.

Accordingly, such an apparatus as illustrated in FIG. 4 has been proposed. The apparatus has an optical-axis deviation correcting function that the light beam is always directed to the partner apparatus by correcting the angular change even if the angle of the apparatus is varied.

FIG. 4 illustrates one of a pair of opposed apparatuses. In FIG. 4, reference numeral 10 denotes an optical system for performing transmission and reception of a light beam. A transmission optical signal to the partner apparatus is emitted from a light emission element 21 such as a semiconductor laser. Light from the semiconductor laser is polarized, and its polarization direction is set parallel to the sheet of FIG. 4. This polarized light is reflected toward a light transmission and reception lens 23 by a polarization beam splitter 22. The light is converted into a substantially parallel light beam 24 with a small divergence by the lens 23, and transmitted toward the partner apparatus.

Light from the partner apparatus is reversely guided along the same optical axis as that of the transmission optical signal from the subject apparatus, and the light thus passes the light transmission and reception lens 23, and enters the polarization beam splitter 22. This reception light from the partner apparatus, however, transmits through the polarization beam splitter 22 since its polarization direction is set orthogonal to that of the transmission light (perpendicular to the sheet of FIG. 4). The reception light thus enters a beam splitter 25. Most part of the reception light is reflected by the beam splitter 25, and enters a light receiving element 26 for detecting an optical signal. A communication signal is thus detected. On the other hand, part of the reception light transmits through the beam splitter 25, and enters a light position detecting element 27.

The light position detecting element 27 is a four-division photodiode as illustrated in FIG. 5, for example. FIG. 5 illustrates a situation in which a light spot 42 impinges on four divided photodiodes 27a to 27d. The position of the light spot 42 can be obtained by comparing outputs of the four photodiodes 27a to 27d with each other. A signal from the position detecting device 27 is arithmetically and logically processed as angle correction information by a control circuit 28. A driving signal is thus supplied to a drive circuit 29 for the optical system 10. Driving mechanisms 30 and 31 for vertical and horizontal directions are moved by the drive circuit 29, and the angle of the optical system 10 is thus driven and controlled such that the light spot 42 can approach a central portion of the light position detecting element 27 to equalize all outputs of the four photodiodes 27a to 27d with each other.

In the optical system 10, positions of the light position detecting element 27, the light emission element 21, and the light receiving element 26 for detecting the optical signal are adjusted such that all their optical axes coincide with each other. Accordingly, when the light spot 42 impinges on the central portion of the light position detecting element 27, the light also impinges on the central portion of the light receiving element 26 for detecting the optical signal, and a central portion of light from the light emission element 21 is emitted toward the partner apparatus.

The optical-axis deviation correction is thus executed such that the transmission light is always directed toward the direction of the reception light, i.e., the partner apparatus.

Further, there has also been proposed an apparatus that has a light deflecting mechanism in the optical system 10 in lieu of the mechanism for correcting the optical-axis deviation correction by driving the optical system itself. For example, in such a mechanism as illustrated in FIG. 6, angles of deflection mirrors 32 and 33 for horizontal and vertical directions are driven by the drive circuit 29, and the optical-axis deviation correction is performed by deflecting light in the lens barrel.

In the above two conventional apparatuses, the optical-axis deviation due to the angular fluctuation of the apparatus is corrected such that communication can be stably achieved even when the divergent angle of the light beam is decreased. Each apparatus, however, has its advantage and disadvantage. Specifically, in a system which includes the driving mechanism provided outside the optical system, and changes the angle of the entire optical system as illustrated in FIG. 4, the variable angle range can be freely widened to cope with a wide angular variation, but it is difficult to rapidly change the angle and to respond to a high-speed angular variation since a relatively heavy mechanism needs to be driven.

On the other hand, in a system which includes the light deflection mechanism provided inside the optical system as illustrated in FIG. 6, a high-speed angular variation can be handled since it is relatively easy to rapidly change the angle of light, but it is difficult to increase the variable angle range since the size of the optical system is limited and the light beam is hence likely to deviate from the optical system if the angle is largely changed.

SUMMARY OF THE INVENTION

It is an object of the present invention to provide a spatial optical communication apparatus that can solve the above-discussed problems.

In one aspect of the present invention, a spatial optical communication apparatus for performing communication between spaced locations with a light beam when situated in a manner opposed to a spaced partner apparatus includes an optical system for effecting at least one of transmission of a light beam to the partner apparatus and reception of a light beam from the partner apparatus, a first unit for varying a directional angle of the optical system, which is provided outside said optical system, and a second unit for varying at least one of an angle of a light beam transmitted to the partner apparatus and an angle of a light beam received from the partner apparatus, which is provided inside the optical system.

In a preferred embodiment, a variable angle range of the first unit is set wider than a variable angle range of the second unit.

In another preferred embodiment, a speed of an angular change of the second unit is set higher than a speed of an angular change of the first unit.

In another preferred embodiment, the optical system includes an optical detector for detecting an angular difference between an optical axis of the optical system and reception light from the partner apparatus, the first unit is controlled on the basis of a low frequency component of an angular signal supplied from the optical detector such that the angular difference between the optical axis of the optical system and the reception light from the partner apparatus can be corrected, and the second unit is controlled on the basis of a high frequency component of the angular signal supplied from the optical detector such that the angular difference between the optical axis of the optical system and the reception light from the partner apparatus can be corrected.

In another preferred embodiment, the second unit includes a position detecting unit for detecting a position of the second unit, and an angle of the first unit is controlled on the basis of a signal supplied from the position detecting unit such that a position of the second unit can be returned to a reference position.

In another preferred embodiment, the second unit is a mirror whose angle is variable.

In another preferred embodiment, the second unit is a les shift optical system in which at least one lens is movable perpendicularly to an optical axis.

In another preferred embodiment, the second unit is a prism whose vertex angle is variable.

These and further aspects and features of the invention will become apparent from the following detailed description of preferred embodiments thereof in conjunction with the accompanying drawings.

DESCRIPTION OF THE PREFERRED EMBODIMENTS (First Embodiment)

Figure 1:
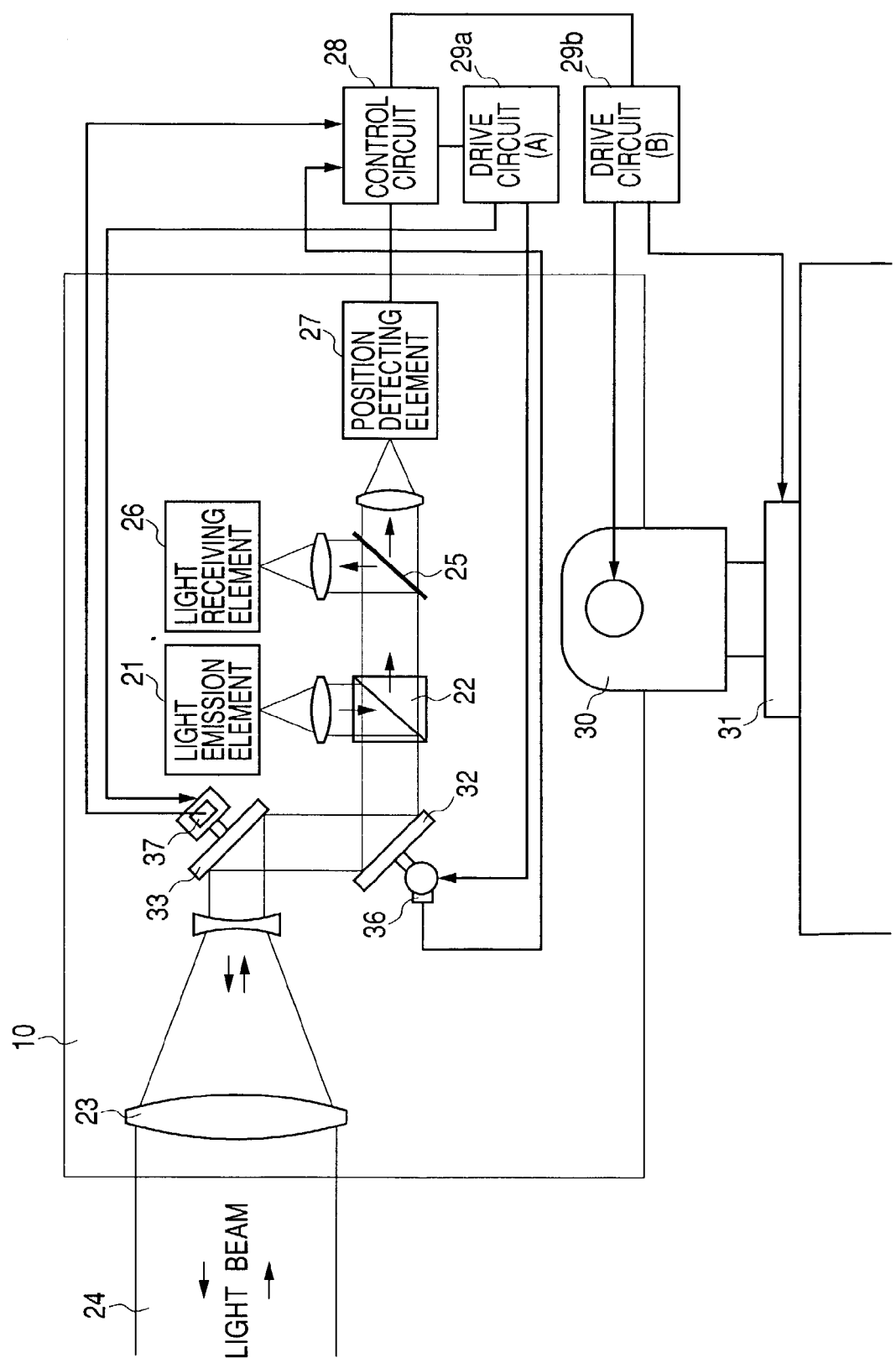
FIG. 1 is a view illustrating a first embodiment according to the present invention.

FIG. 1 shows a spatial optical transmission apparatus having the optical-axis deviation correcting function according to the present invention.

Figure 4:
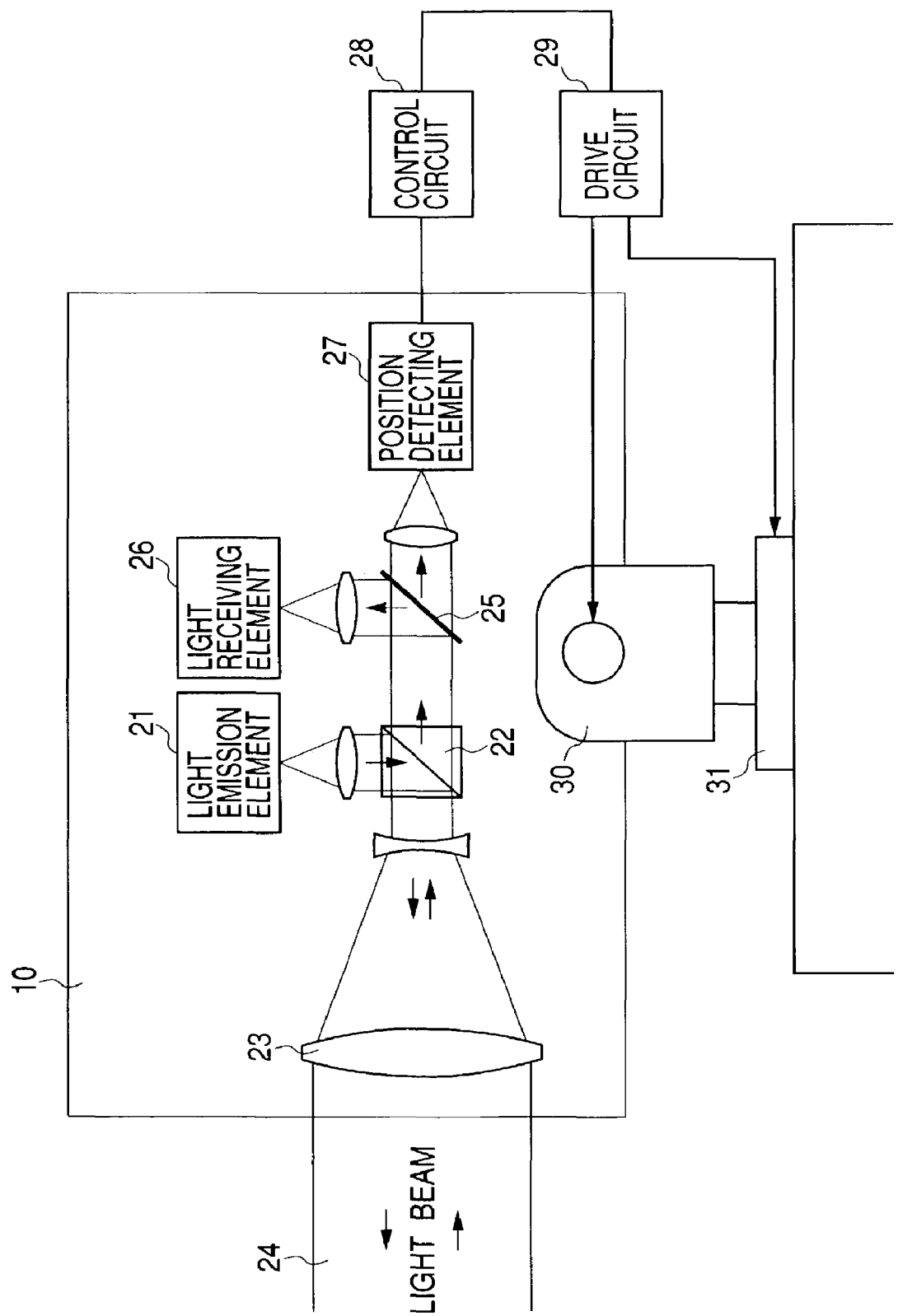
FIG. 4 is a view illustrating a conventional example.
Figure 5:
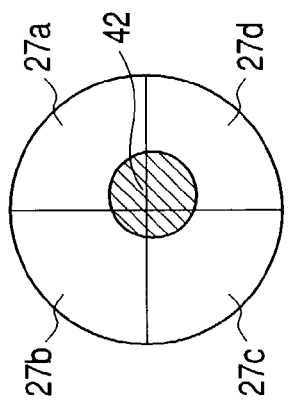
FIG. 5 is a view illustrating an example of a spot position detecting device.
Figure 6:
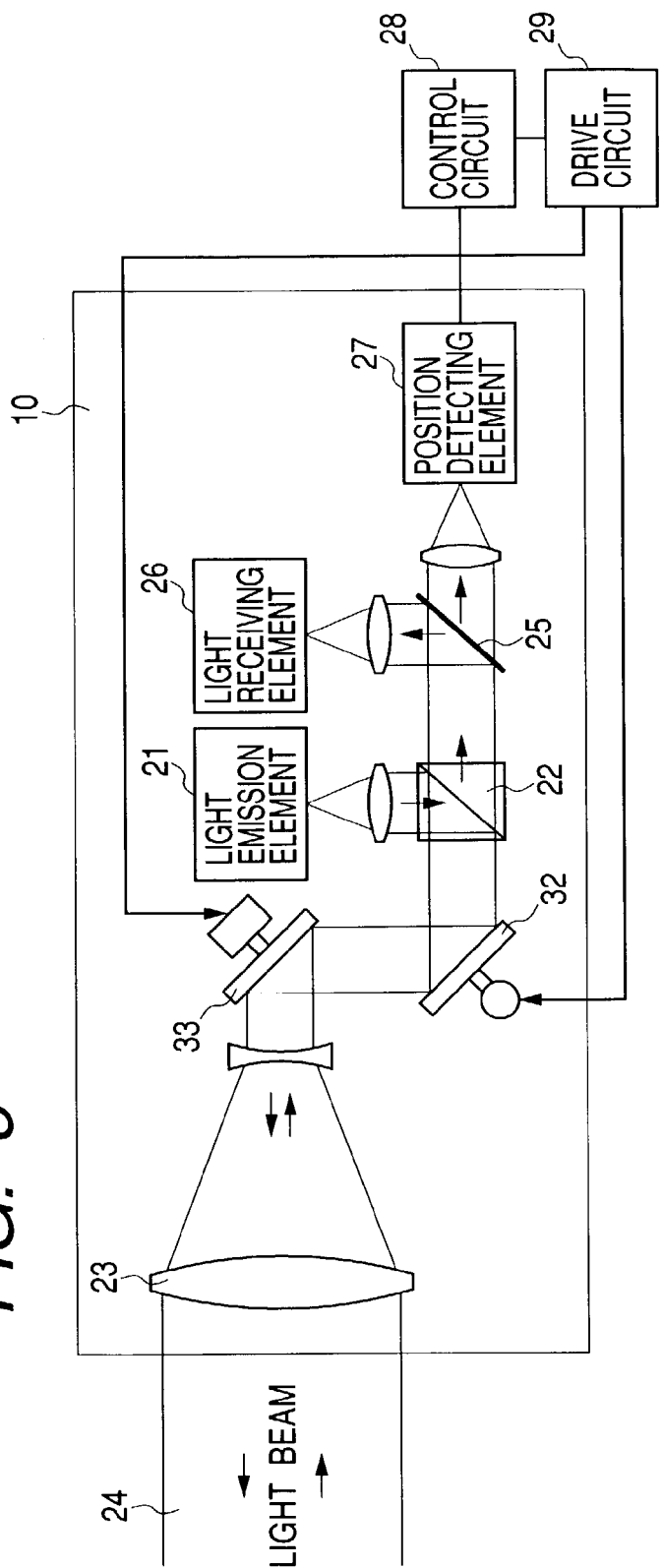
FIG. 6 is a view illustrating another conventional example.

In FIG. 1, light from a light emission element 21 is reflected toward a light transmission and reception lens 23 by a polarization beam splitter 22, similar to the conventional apparatuses as illustrated in FIG. 4 and FIG. 6. After its direction is correctly adjusted by light deflection mirrors 32 and 33, the reflected light is transmitted toward the direction of a partner apparatus as a substantially parallel light beam 24 with a small divergence.

Light from the partner apparatus is reversely guided along the same optical axis as that of the transmission optical signal from the subject apparatus, and the light thus passes through the light transmission and reception lens 23, is reflected by the light deflection mirrors 32 and 33, and enters the polarization beam splitter 22. This reception light from the partner apparatus, however, transmits through the polarization beam splitter 22 since its polarization direction is set orthogonal to that of the transmission light. The reception light thus enters a beam splitter 25. Most part of the reception light is reflected by the beam splitter 25, and enters a light receiving element 26 for detecting an optical signal. A communication signal is thus detected. On the other hand, part of the reception light transmits through the beam splitter 25, and enters a light position detecting element 27. These are also similar to those of the conventional apparatuses as illustrated in FIG. 4 and FIG. 6.

A signal from the position detecting element 27 is arithmetically and logically processed as angle correction information by a control circuit 28. Driving signals are thus supplied to a drive circuit (A) 29a for the light deflection mirrors 32 and 33 and a drive circuit (B) 29b for an optical system 10, respectively.

In general, with respect to angular variations of a building or an installation mount due to wind pressure, vibration, and the like, which impart the optical-axis deviation to the apparatus, a high-speed variation component with high frequency has a small amplitude while a low-speed variation component with low frequency has a large amplitude.

The control circuit 28 divides the angular variation signal from the position detecting device 27 into low frequency component (less than several Hz) and high frequency component (from several Hz to several tens Hz) to cope with the angular variation having the above characteristics. The control circuit 28 thus supplies the following drive signals to the drive circuit (A) 29a for the light deflection mirrors 32 (its deflection axis lies on the sheet of FIG. 1) and 33 (its deflection axis is perpendicular to the sheet of FIG. 1) having narrow angular variation ranges and high-speed responses, respectively. Those drive signals serve to correct variation components with small amplitudes and high frequencies. The control circuit 28, on the other hand, supplies a drive signal which can correct variation components with large amplitudes and low frequencies to the drive circuit (B) 29b for the optical system 10 having a wide angular variation range and a low-speed response. The optical-axis deviation correction is thus effected for both the angular variation with small amplitude and high frequency and the angular variation with large amplitude and low frequency.

However, when adjusting mechanisms of those two systems are provided, it is necessary to adjust the mutual relationship between respective adjusting angles. Specifically, it is desirable to move the light deflection mirrors 32 and 33 having narrow ranges of adjusting angles within central adjusting ranges near their reference positions such that those mirrors would not gradually approach ends of the adjusting ranges during the operation of optical-axis deviation correction. Therefore, in this embodiment, the light deflection mirrors 32 and 33 are respectively provided with angle sensors 36 and 37 to supply angular information of these mirrors to the control circuit 28. The angle sensor can be a rotary encoder, a potentiometer, a Hall element, a position detecting optical system, or the like. On the basis of the angular information, the control circuit 28 supplies control signals to the drive circuits (A) 29*a* and (B) 29*b* to correct average angles of the light deflection mirrors 32 and 33 as well as the low-speed angular variation of the optical system 10. In other words, drive mechanisms 30 (its deflection axis lies on the sheet of FIG. 1) and 31 (its deflection axis is perpendicular to the sheet of FIG. 1) for the optical system 10 are controlled such that positions of the light deflection mirrors 32 and 33 can be corrected and returned to their reference positions upon deviation of these positions from the reference positions.

When angular drive ranges of the drive mechanisms 30 and 31 for the optical system 10 are set sufficiently wide, the system of this embodiment can also be applied to communications between mobiles in which the partner apparatus or the subject apparatus is situated on a vehicle, a vessel, or the like. The driving mechanisms 30 and 31 for the optical system 10 can handle correction of large angular changes accompanying the movement of the mobile, and the light deflection mirrors 32 and 33 can handle correction of high-speed angular changes such as vibrations of the vehicle.

(Second Embodiment)

Figure 2:
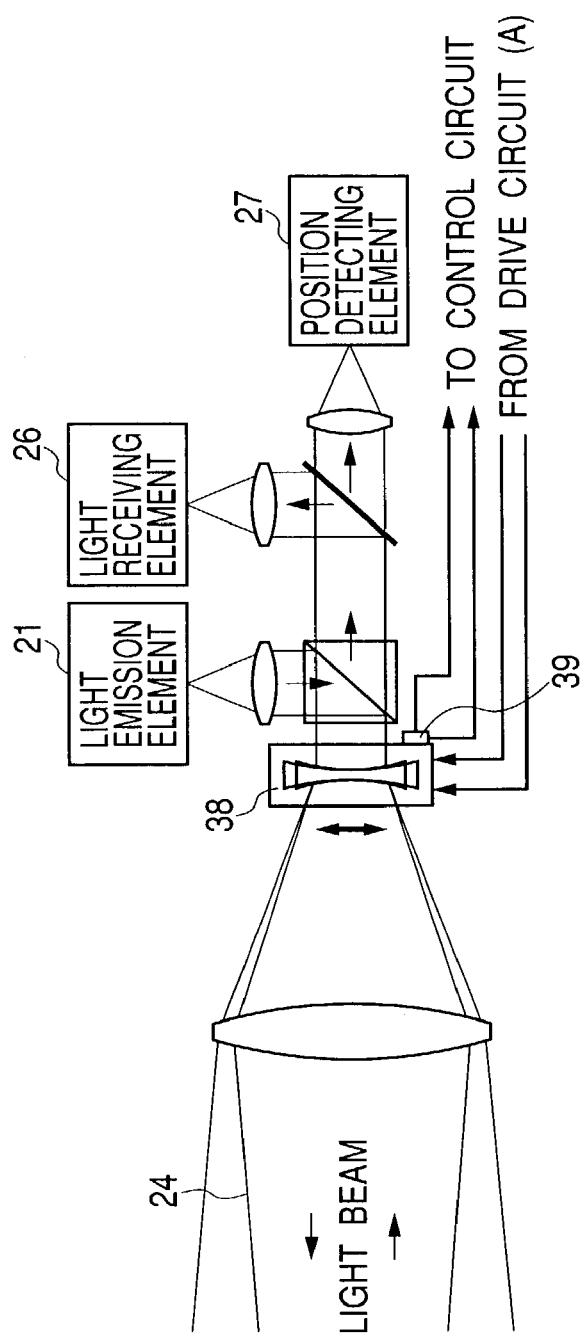
FIG. 2 is a view illustrating a second embodiment according to the present invention.

A second embodiment of FIG. 2 uses a so-called lens shift optical system 38 as a means for deflecting light at high rate in the optical system in place of the light deflection mirrors 32 and 33. A lens of the lens shift optical system 38 is moved perpendicularly to the optical axis. Movement of the lens in the sheet of FIG. 2 is indicated in FIG. 2, but actually the lens can be freely moved in a two-dimensional manner along directions parallel and perpendicular to the sheet of FIG. 2. The light beam 24 is deflected in accordance with the shift amount of the lens. A driving means for the lens shift can be an actuator using a voice coil, a linear motor, or the like.

The second embodiment further includes a lens position sensor 39 for detecting shift amounts of the lens in the parallel and perpendicular directions. The lens position sensor 39 supplies position information to the control circuit 28, similar to the first embodiment, to control the driving mechanisms 30 and 31 for the optical system 10 such that the shift lens can be always moved in the vicinity of the central reference position. The lens position sensor 39 can be a linear potentiometer, a Hall element, a position detecting optical element, or the like.

(Third Embodiment)

Figure 3:
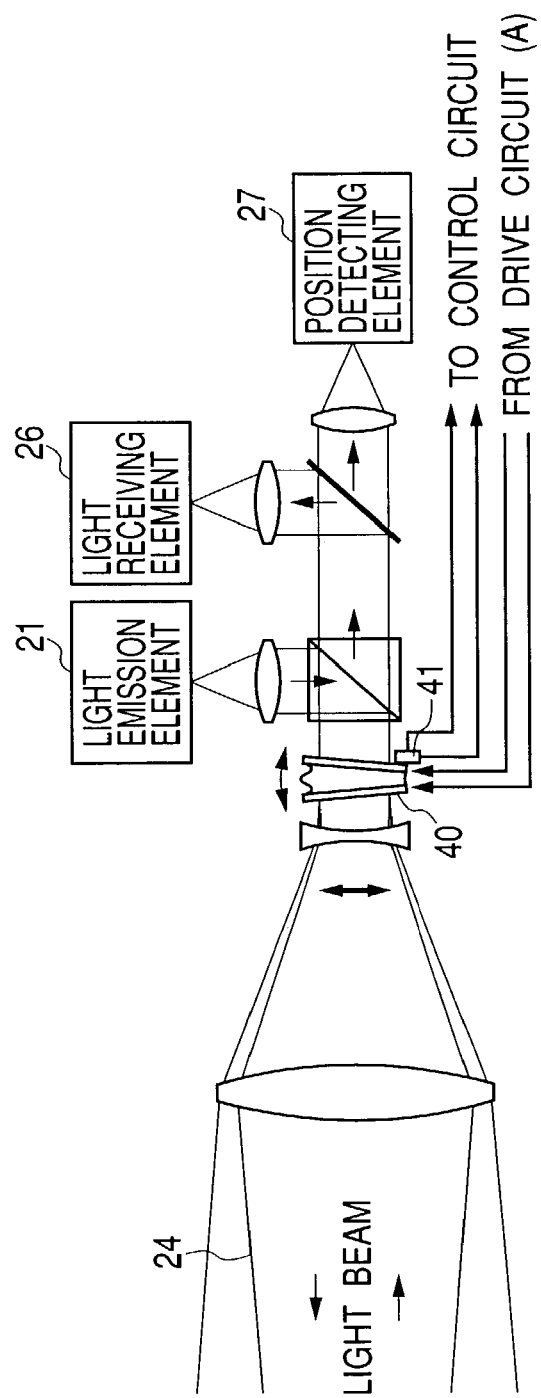
FIG. 3 is a view illustrating a third embodiment according to the present invention.

A third embodiment of FIG. 3 uses a variable vertex-angle prism 40 as a means for deflecting light at high rate in the optical system in place of the light deflection mirrors 32 and 33. In the variable vertex-angle prism 40, transparent liquid is provided between two transparent plates, and the magnitude of the lens effect of light deflection and the like is varied by changing the angle between the two transparent plates. Vertex-angle drive in the sheet of FIG. 3 is indicated in FIG. 3, but actually the vertex angle can be freely changed in a two-dimensional manner along directions parallel and perpendicular to the sheet of FIG. 3. Optical angle of refraction is changed, and the light beam 24 is hence deflected in accordance with the amount of change of the vertex angle. A driving means for varying the vertex angle can be an actuator using a voice coil, a linear motor, or the like, similar to the second embodiment.

The third embodiment further includes an angle sensor 41 for detecting the vertex-angle amount of the prism in the parallel and perpendicular directions, similar to the first embodiment. The angle sensor 41 supplies position information to the control circuit 28 to control the driving mechanisms 30 and 31 for the optical system 10 such that the vertex angle of the prism can be always changed in the vicinity of the reference angle around zero degree. The angle sensor 41 can be a rotary encoder, a potentiometer, a Hall element, a position detecting optical element, or the like.

In the above embodiments, apparatuses capable of light transmission and reception are discussed as the spatial optical communication apparatus of the present invention, but the present invention is not limited to such apparatuses capable of light transmission and reception. The present invention can also be applied to a spatial optical communication apparatus only capable of light transmission, or a spatial optical communication apparatus only capable of light reception. Further, in the optical system 10 of each embodiment, optical axes of the light transmission and reception optical system coincide with each other, but the present invention can also be applied to an embodiment in which optical axes of a light transmission optical system and a light reception optical system are separately provided in a spaced manner.

As discussed in the foregoing, according to the present invention, in a spatial optical communication apparatus for performing communication between spaced locations with a light beam when situated in a manner opposed to a spaced partner apparatus, the apparatus are provided with both a light deflecting unit set inside an optical system with a narrow variable angle range and a fast response speed, and an optical system driving unit set outside the optical system with a slow response speed and a wide variable angle range, and therefore, the optical-axis deviation correction is possible at the same time for both high-speed angular variation with a small amplitude and low-speed angular variation with a large amplitude. The thus-achieved spatial optical communication apparatus has a function of correcting the optical-axis deviation whose application range is wide and whose correction ability is high.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A spatial optical communication apparatus for performing communication between spaced locations with a light beam when situated in a manner opposed to a spaced partner apparatus, said spatial optical communication apparatus comprising:

an optical system for effecting at least one of transmission of a light beam to the partner apparatus and reception of a light beam from the partner apparatus, wherein said optical system includes an optical detector for detecting an angular difference between an optical axis of said optical system and reception light from the partner apparatus, said first means is controlled on the basis of a low frequency component of an angular signal supplied from said optical detector such that the angular difference between the optical axis of said optical system and the reception light from the partner apparatus can be corrected, and said second means is controlled on the basis of a high frequency component of the angular signal supplied from said optical detector such that the angular difference between the optical axis of said optical system and the reception light from the partner apparatus can be corrected;

first means for varying a directional angle of said optical system, said first means being provided outside said optical system; and second means for varying at least one of an angle of a light beam transmitted to the partner apparatus and an angle of a light beam received from the partner apparatus, said second means being provided inside said optical system, wherein said second means includes position detecting means for detecting a position of said second means, and an angle of said first means is controlled on the basis of a signal supplied from said position detecting means such that a position of said second means can be returned to a reference position.

* * * * *